Oct. 2, 1962      W. J. SLAVIN      3,056,570
MOUNTING MECHANISM FOR AUTOMOBILE RADIO ANTENNA
Filed July 3, 1961

INVENTOR
WILLIAM JOSEPH SLAVIN
BY Maybee & Legres
ATTORNEYS

United States Patent Office 3,056,570
Patented Oct. 2, 1962

3,056,570
MOUNTING MECHANISM FOR AUTOMOBILE RADIO ANTENNA
William Joseph Slavin, 131 Burnham St., Belleville, Ontario, Canada
Filed July 3, 1961, Ser. No. 121,421
4 Claims. (Cl. 248—43)

This invention relates to mounting mechanism whereby an antenna may be detachably secured to an automobile.

Although the installation of radios in automobiles and in trucks is a commonplace and accepted practice, it frequently occurs that persons who drive vehicles owned by their employers, in the course of their employment, are prohibited from enjoying the use of a radio in these vehicles. One reason is that the employer may be unwilling to add the cost of a radio and its installation to the cost of the vehicle. Secondly, the employee is usually prohibited from installing a radio of his own for a number of reasons. Perhaps the chief of these reasons is that it is almost universally the practice to mount the antenna on the vehicle by drilling a hole in the vehicle body, usually in the fender and mounting the aerial in this hole by means of an insulated bushing and mounting mechanism. Employers object to their employees mounting their own radios in vehicles on the grounds that when the vehicle is sold by the employer the employee will wish to first remove his radio which will leave the vehicle with an unsightly hole in the body which either reduces the sale value of the vehicle or imposes an expense upon the employer in order to have the hole repaired.

It is an object of the present invention to provide a mounting mechanism which will enable an antenna to be detachably secured to an automobile body in a manner which makes both the installation and the removal extremely simple and which will not result in any damage to the vehicle to which objection could be taken.

The invention will be described by way of example only with reference to the accompanying drawings in which a preferred form of the invention is illustrated, like reference numerals being used to designate like parts in the various views in which.

Figure 1:
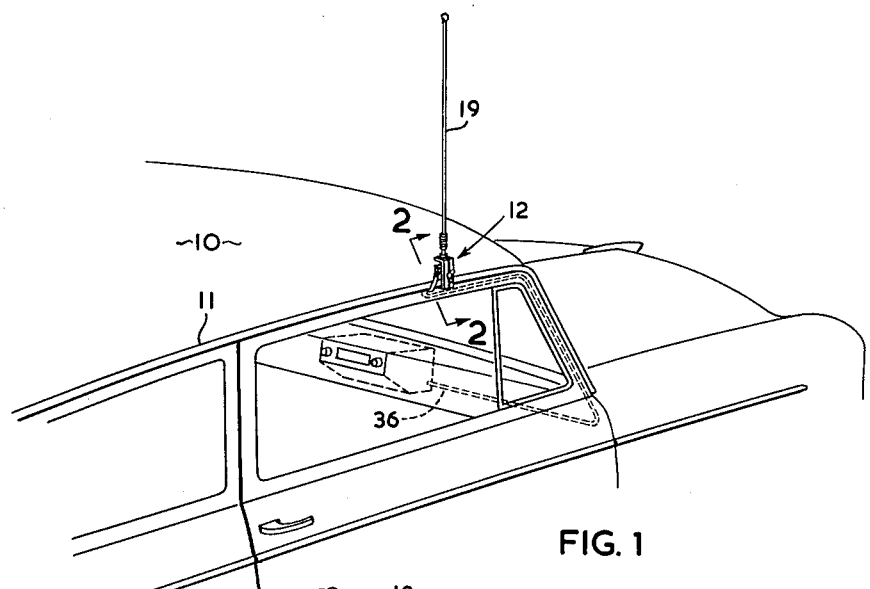
FIGURE 1 is a perspective view of a portion of an automobile illustrating the mounting mechanism of the invention in position.
Figure 2:
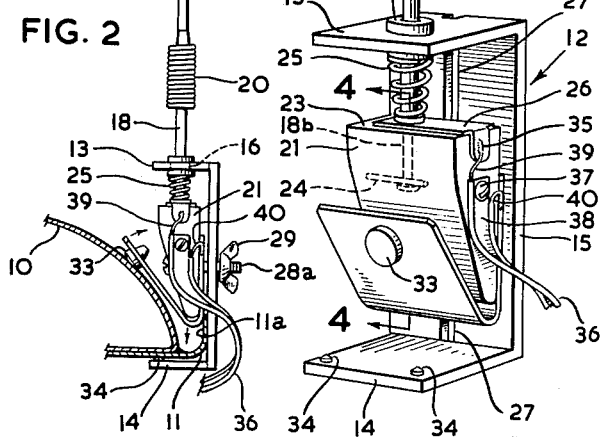
FIGURE 2 is a detailed view showing a portion of the automobile in cross-section and the mounting mechanism in side elevation.

Referring now to the drawings, and in particular to FIGURES 1 and 2, it will be observed that, as is the consistent practice among automobile manufacturers, the automobile body includes a roof 10 which is, adjacent its side edge, a downwardly sloping convex surface terminating in an upwardly opening, generally U-shaped gutter 11. It is to this portion of the automobile that the mounting mechanism of the present invention is applied and the mounting mechanism itself, although shown in all these views, is particularly illustrated in FIGURE 3.

In this figure, the mounting mechanism may be seen to be primarily contained within a U-shaped bracket generally indicated by the reference character 12 and specifically comprising two parallel, spaced legs 13 and 14 joined by an integral web 15.

One of the two legs is provided with an aperture 16 (see FIG. 2) within which is mounted a bushing 17 of any suitable insulating material. Slidably received within the insulating bushing 17 is a rod 18 which, at one end, carries the antenna 19 by means of a tightly wound, relatively strong coil spring 20 one end of which is forced over end 18a of the rod 18 and the other end of which is forced over the lower end 19a of the antenna 19. The purpose of the coil spring 20 is to resiliently mount the antenna 19 while, at the same time, providing for electrical continuity between the antenna 19 and the rod 18 for reasons which will become apparent below.

Figure 3:
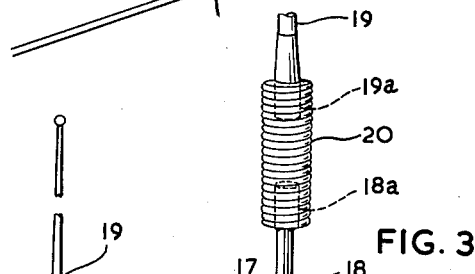
FIGURE 3 is a detailed perspective view of the mechanism shown in FIGURES 1 and 2.
Figure 4:
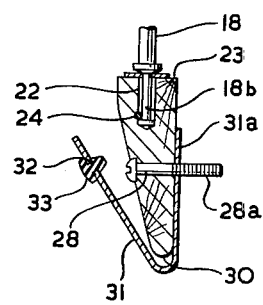
FIGURE 4 is a section view taken along line 4—4 of FIGURE 3.

At its other end, the rod 18 carries an electrically insulating pressure block 21 which lies within the U-shaped bracket 12 and which is generally triangular in vertical cross-section as may readily be seen in FIGURE 4. The pressure block 21 may be conveniently secured to the lower end of the rod 18 by means of a drilling 22 (see FIG. 4) provided in its upper surface 23. The lower end 18b of the rod 18 is shaped in the manner shown in FIGURE 4 and, when inserted in the drilling 22, may be retained in position by means of a transverse pin 24 as is seen in FIGURES 3 and 4.

A compression spring 25 surrounds the rod 18 and, at one end, bears against the leg 13 of the U-shaped bracket 12, through the medium of the insulating bushing 17 so as to be electrically insulated from the bracket 12 and, at the other end, bears upon the upper surface 23 of the pressure block 21 through the medium of a metallic contact strip 26.

The integral web 15 of the U-shaped bracket 12 which joins legs 13 and 14 is provided with a slot 27, conveniently running for the full length of the web 15 and lying parallel to the rod 18 and centrally of the width of the web 15. A bolt 28 is provided and passes through the pressure block 21 and through the slot 27 in the web 15 and, over its threaded end 28a carries a wing nut 29. The bolt and nut arrangement enables the pressure block 21 to be securely clamped to the U-shaped bracket 12 so as to occupy any fixed position relative thereto.

The pressure block 21, over that edge 30 remote from the rod 18 is provided with a deformable shield 31 in the form of a U-shaped sheet metal member one leg 31a of which is provided an aperture through which the bolt 28 also passes in order to hold the shield 31 to the pressure block 21 in the position shown in the drawings. Optionally, the shield 31 may be provided with an aperture 32 within which may be mounted a resilient button such as that shown at 33.

The other leg 14 of the U-shaped bracket 12 is provided with sharp, hard projections 34 which, when the mounting mechanism is fixed to an automobile, will engage the automobile body to prevent slippage of the device and to provide a good electrical contact in a manner and for a purpose which will become apparent from the following description of the operation and function of the device.

Referring now primarily to FIGURE 2, it will be seen that the mounting mechanism, during application to an automobile body, is positioned with the lower leg 14 of the U-shaped bracket lying beneath the upwardly opening U-shaped gutter with the hard and sharp projection 34 in engagement with the lower surface of the gutter. The pressure block 21 may then be grasped by the hand and raised against the action of the spring 25 to permit it to pass over the upper and outer lip of the gutter 11 and, subsequently, the spring 25 will force the pressure block 21 downwardly into the gutter. The block 21 enters the gutter readily since its lower edge 30 is of a shape adapted for this purpose and the shape of the lower edge 30 of the block is similar to the shape of the adjacent portion of the shield 31. The shield 31 may be manually deformed in order to generally conform to the curvature of the convex roof surface 10 and when the pressure block 21 has been firmly seated within the gutter 11, the wing nut 29 may be tightened so as to draw the pressure block and the shield 31 towards the integral web 15 and to thereby clamp the upwardly extending outer wall 11a of the gutter 11 between the web 15 and the pressure block-shield combination. The engagement between the clamping mechanism and the automobile thereby provided is assisted by the slight penetration of the sharp projections 34 into the lower surface of the gutter and by the contact between the resilient button 33 and the convex roof surface 10. This three-point contact and bearing provides for a rigid and stable attachment which is readily capable of withstanding the vibration and wind loads to which a device of this nature is continuously subjected during operation of the vehicle.

Although not a significant part of the present invention, means are obviously required to connect the antenna to a radio within the vehicle. It has been found that these means may be satisfactorily embodied in the conventional two-conductor, spaced, flat cable which is normally used to connect television receiving sets to television antennae. One lead of this two-conductor cable is secured by any suitable means such as soldering, to the contact strip 26 in a manner illustrated at 35. The pressure block 21 is made of insulating material and it has been found that wood is quite suitable for this purpose. The two-conductor cable 36 may, itself, also be mechanically secured to the pressure block 21 by any suitable means such as, for example, a wood screw 37 which passes through the insulating web 38 which separates the two conductors, one from the other and enters and engages the wooden pressure block 21.

The antenna 19 may, accordingly, be seen to be in electrical contact with the conductor 39 through the spring 20, the rod 18, the spring 25, the contact strip 26 and the soldered connection 35. It is electrically insulated from the remaining structure by the insulating bushing 17 and the insulating wooden pressure block 21.

The operation of the radio will, in almost all circumstances, either require or be enhanced by a connection to the vehicle body to constitute a "ground." This may very conveniently be provided, in accordance with the present invention, by utilizing the second conductor 40 of the two-conductor lead or cable 36 which is conveniently located adjacent the mounting mechanism in a position such that it may readily be soldered or otherwise electrically connected to the shield 31 which, being of sheet metal and in electrical contact with both the bolt 28 and the web 15 will provide a "ground" path through the bolt 28, the web 15, the leg 14 and the sharp and hardened projections 34 which penetrate the metal material of the lower surface of the gutter 11 and hence provide a good electrical contact between the conduit 40 and the automobile body.

The invention has been described by way of example with reference to a preferred embodiment but it is to be understood that minor modifications and variations of this embodiment are contemplated within the spirit of the invention and the scope of the appended claims.

What I claim as my invention is:

1. Mounting mechanism for detachably securing an antenna to that portion of the body of an automotive vehicle consisting of a downwardly sloping concave roof surface terminating in an upwardly opening, generally U-shaped gutter; comprising a U-shaped bracket having two spaced parallel legs joined by an integral web, one leg having an aperture therein and an insulating bushing in the aperture, a rod slidably passing through the bushing and carrying an antenna at one end and, at the other end, and within the U-shaped bracket, carrying a pressure block, a deformable shield surrounding the edge of the pressure block remote from the rod, a compression spring urging the pressure block and the shield towards the other leg of the U-shaped bracket and means to clamp the pressure block and the shield in a fixed position relative to the U-shaped bracket so that the aerial may be secured to the automobile by placing the said other leg of the U-shaped bracket beneath the gutter permitting the spring to urge the pressure block and the shield into the gutter, deforming the shield to conform to the contour of the convex roof surface and clamping the block and shield to the U-shaped bracket.

2. Mounting mechanism as claimed in claim 1 wherein the said other leg of the U-shaped bracket is provided with sharp, hard projections extending towards said one leg so as to engage the lower surface of the gutter to prevent slippage and to ensure a good electrical contact between the U-shaped bracket and the vehicle body.

3. Mounting mechanism as claimed in claim 1 wherein the means to clamp the pressure block and the shield to the U-shaped bracket comprises a bolt passing through the block and through the shield and through a slot in the integral web of the U-shaped bracket, the slot lying parallel to the rod so that the bolt may move along the slot as the pressure block and the shield are displaced within the U-shaped bracket, and a nut threadably engaging the bolt to clamp the assembly together in fixed relationship.

4. Mounting mechanism as claimed in claim 1 wherein the edge of the pressure block and that portion of the shield surrounding it are of a shape such as to enter the upwardly opening gutter on the roof and, when in the gutter and clamped to the U-shaped bracket, to securely engage the roof and the gutter of the automobile in fixed clamping relationship.

References Cited in the file of this patent

UNITED STATES PATENTS

| | | |
|---|---|---|
| 2,603,394 | Beck | July 15, 1952 |
| 2,643,841 | Wallace | June 30, 1953 |

FOREIGN PATENTS

| | | |
|---|---|---|
| 1,084,496 | France | July 7, 1954 |
| 1,235,268 | France | May 23, 1960 |